United States Patent [19]

Kuhne

[11] Patent Number: 5,072,818
[45] Date of Patent: Dec. 17, 1991

[54] ELASTIC CLUTCH

[75] Inventor: Viktor Kuhne, Bopfingen, Fed. Rep. of Germany

[73] Assignee: J. M. Voith GmbH, Heidenheim, Fed. Rep. of Germany

[21] Appl. No.: 492,092

[22] Filed: Mar. 12, 1990

[30] Foreign Application Priority Data

Mar. 21, 1989 [DE] Fed. Rep. of Germany ....... 3909234

[51] Int. Cl.$^5$ .................. F16D 3/14; F16D 47/02
[52] U.S. Cl. .................. 192/106.1; 464/24; 464/68
[58] Field of Search .......... 192/106.1; 74/574; 464/24 X, 66, 68 X

[56] References Cited

U.S. PATENT DOCUMENTS

| | | | |
|---|---|---|---|
| 2,316,820 | 4/1943 | Thelander | 464/68 |
| 2,520,180 | 8/1950 | Thelander | 267/128 |
| 4,148,200 | 4/1979 | Schallhorn et al. | 464/66 |
| 4,468,207 | 8/1984 | Yoshida | 464/66 |
| 4,537,580 | 8/1985 | Loizeau et al. | 464/66 |

FOREIGN PATENT DOCUMENTS 3901467 2/1990 Fed. Rep. of Germany .
2371609 7/1978 France ................. 192/106.1

Primary Examiner—Allan D. Herrmann
Assistant Examiner—Andrea Pitts
Attorney, Agent, or Firm—Jeffers, Hoffman & Niewyk

[57] ABSTRACT

The invention concerns an elastic clutch including a hydraulic damping device wherein a viscous damping medium is displaced through predetermined gaps upon occurrence of large angles of rotation. To that end, a cam arranged on one clutch half plunges into a capsule type displacement chamber. The cam features friction elements which in the plunging make elastic and sealing contact with the sidewalls of the capsule, thereby causing both an effective sealing of the displacement chamber and also a frictional damping which supports the hydraulic damping. The disk type second clutch half can, during operation, more freely adjust within the clutch, which simplifies the manufacture.

16 Claims, 2 Drawing Sheets

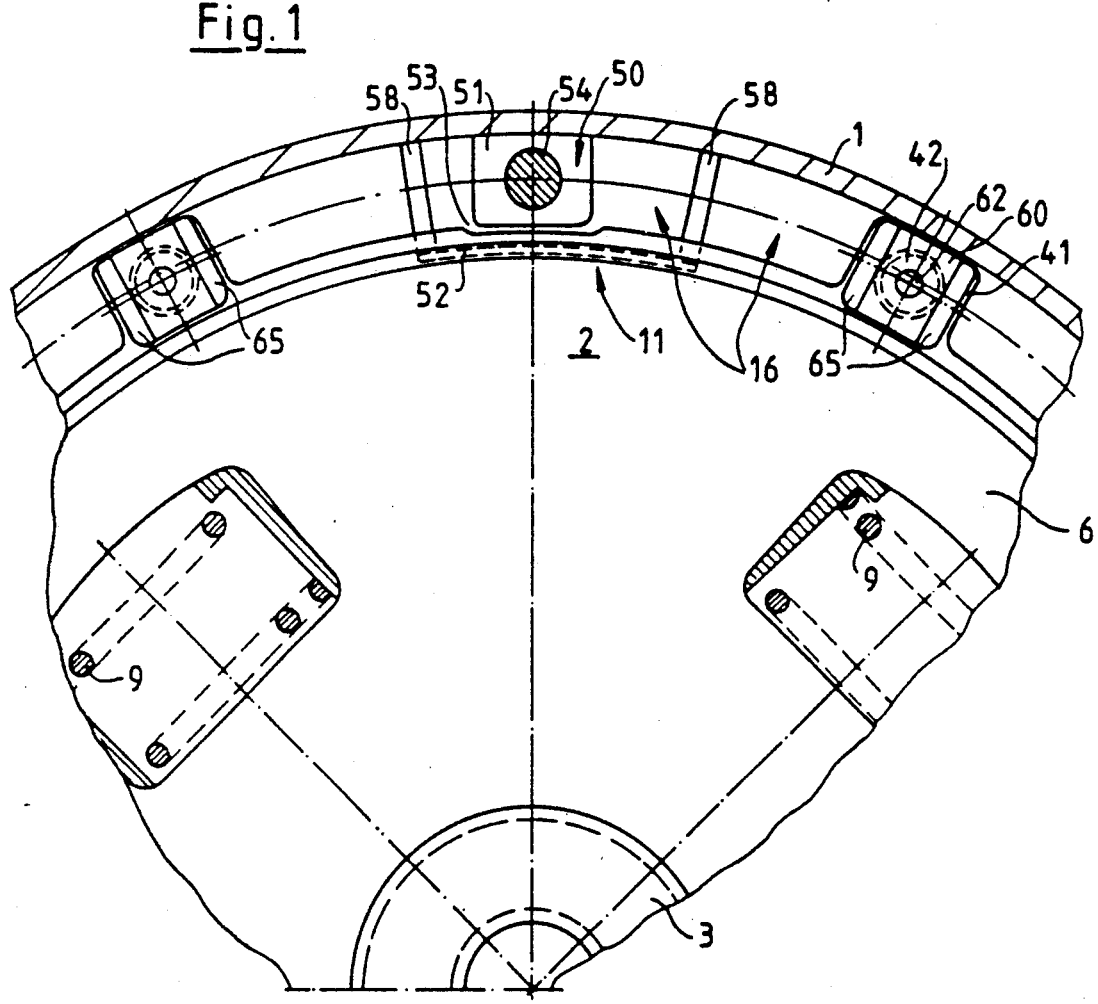

ELASTIC CLUTCH

BACKGROUND OF THE INVENTION

The invention concerns an elastic clutch, specifically a two-mass flywheel for an internal combustion engine. A clutch of this category has been proposed in German Patent Application No. P3901467.3-12.

Clutches of this type are used in conjunction with internal combustion engines, specifically in vehicles, in order to improve the vibration behavior of the drive train in all operational and rotational speed ranges. To be suppressed are specifically torsional vibrations of the engine when passing through the critical speed of rotation.

In addition to springs for absorbing torsional jolts, the prior art clutch features for that purpose a damping device, which consists of one or more displacement chambers arranged on the circumference of the fluid-tight clutch that is filled with a damping medium. In displacement chamber is a cam which is effective in the peripheral direction. Another cam, which at a larger angle of rotation engages the displacement chamber, is located on the other clutch half. The enclosed damping medium is thereby displaced, through narrow gaps, into the interior of the clutch. To that end it was proposed to design the displacement chamber as an independent hermetic capsule in order to achieve a heavy damping especially when passing through the resonance speed of rotation. It has been demonstrated that the damping effect is not sufficient at specific operating conditions because the damping medium can still escape, at a large angle of rotation, through excessively wide gaps without contributing to damping.

Previously known from U.S. Pat. No. 2,520,180 is a clutch disk through which within the springs serving to transmit the torque each features a damping device. This device comprises a cylinder into which plunges a piston which is surrounded by an elastic boot. While fluid is to be drawn in through a predetermined opening and displaced again, this is supposed to take place without metallic friction. A damping effect graduated across the angle of rotation is not produced thereby.

SUMMARY OF THE INVENTION

The problem underlying the invention is to design a clutch of the aforementioned type such that the damping performance will be improved at large angles of rotation, especially in the resonance range in starting and stopping the engine.

This problem is solved by the present invention wherein there is provided on the cam coordinated with the second clutch half at least one friction element which, as the cam plunges into the displacement chamber formed by a capsule, that is, at a large relative angle of rotation, makes frictional contact with the defining wall. The friction element bears elastically on the side inner surface of the capsule, i.e., in axial direction, based on the axis of rotation of the clutch, and seals the gap between the cam and the defining wall.

The advantage of this arrangement is that in the case of large angles of rotation, which occur especially in the resonance speed range of the engine, there is obtained not only the known hydrodynamic damping within the displacement chamber but additionally a frictional damping. Also, the hydrodynamic damping is improved because the friction element forms in the area of the plunging cam a seal against the expulsion of damping medium. In the range of large angles of rotation, the design of the invention displays a damping characteristic that strongly increases.

Another advantage of the invention is that, due to the frictional damping, the dependency of the overall damping upon the temperature of the damping medium is lower. Owing to the mode of operation in the fluid-filled part of the clutch, moreover, there is no risk of friction element wear.

Additional embodiments of the invention are also disclosed. As shown in FIG. 2, the friction element may have a split design and may be arranged on both sides of the cam. This results in axially balanced tensioning between the defining walls of the capsule and free axial adjustment of the center disk within the capsule, that is, the displacement chamber. The center disk may be fastened on the hub with larger tolerances. As long as the cam is located outside the capsule, at a small angle of rotation, the friction elements can be expanded by means of a spring to a distance that is greater than the clearance within the capsule. Bevels on the friction elements and/or the capsule facilitate the movement. The guidance of the friction elements in the cam may be provided through centering projections which move into appropriate openings in the cam. The radial expanse of the friction elements is greater than the cam itself in order to achieve an improved tightness with the defining wall of the capsule, with the friction element preferably having a rectangular design. The friction element may be provided with walls which in peripheral direction wrap around the ends of the cam. Formed thereby is a maze seal which contributes to the fact that the damping medium will be forced out of the displacement chamber only through the damping gaps provided, but not in the area of the cams.

In the present invention, the hydrodynamic damping is augmented by means of an additional frictional damping, due to the displacement of damping medium through apertures, especially at large angles of rotation.

BRIEF DESCRIPTION OF THE DRAWINGS

An embodiment of the invention will be more fully explained hereafter with reference to the drawings:

FIG. 1 is a schematic, partly cut-away end view of the inventional clutch;

FIG. 3 is an alternative embodiment of the friction elements in cylindrical section similar to FIG. 2a.

DETAILED DESCRIPTION

Figure 2A:
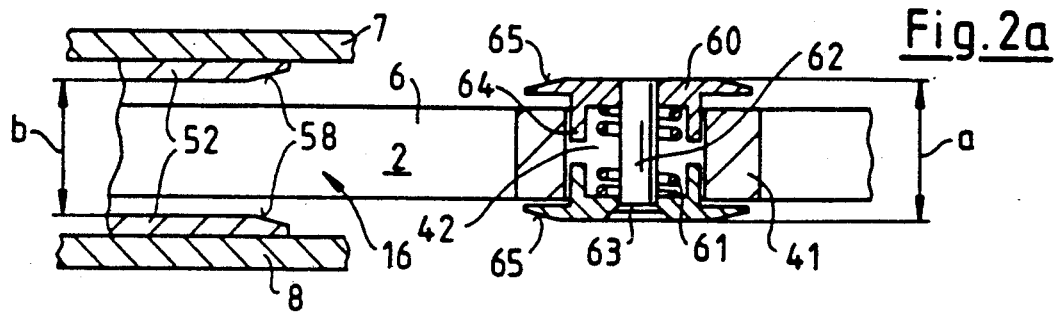
FIGS. 2a through 2c are cylindrical sectional views of the displacement chamber at various positions of the cam.

The clutch schematically illustrated in FIG. 1 comprises a first clutch half 1 which is connected with an engine (not shown) and envelopes a second clutch half 2. The second clutchhalf 2 consists essentially of at least one center disk 6 that is connected with a hub 3 which, in turn, is arranged on the shaft of a transmission (not shown). The first clutch half 1 comprises side disks 7, 8 (FIG. 2) and, through tangentially arranged springs 9, is in customary fashion in elastic torsional connection with the center disk 6. The two side disks 7, 8 form a fluid-tight interior 11 that is filled with a viscous medium and in the radially outer area of which there are several capsules 50 fastened by means of axial bolts 54.

The capsule 50 consists of a cam 51 oriented radially inward and of sidewalls 52 which, in turn, are in contact with the side disks 7, 8.

In the radially outer area of the side disks 6, there are cams 41 arranged which are oriented radially outward. Between the individual cams 41, the side disk 6 extends in essentially circular fashion, with a restriction aperture 53 provided in the area of the cam 51 of the capsule 50. The facing radial surfaces of cams 51 and 41 form together with the side disks 7, 8 of the first clutch half 1 displacement chambers 16, the volumes of which vary at a relative rotation of the two clutch halves. The viscous medium enclosed in it is displaced through the radial gap 53 and other gaps which incidentally occur in fabrication, for instance on the circumference of the cam 41. The sidewalls 52 protrude radially inward up into the area of the center disk 6 so that, here too, an axial seal may be provided, for example a maze seal.

FIG. 2a, in a diagrammatic cylinder section, shows the peripheral area between the cam 41 and the area between the sidewalls 52 of the capsule 50. On the cam 41 there are provided, on both sides, friction elements 60 which axially run in openings 42 in the cam 41 by way of projections 64. The two friction elements 60 are axially expanded outwardly by means of an expansion spring 61. The bolt 62 is in the present embodiment fastened to the one friction element 60 and features on the other end a stop 63 which adjusts the two friction elements 60 to an axial dimension a. This axial dimension a, in the rotational position where the cam 41 has not moved yet between the sidewalls 52 of the capsule 50, is greater than the clearance b between the sidewalls 52.

Figure 2B:
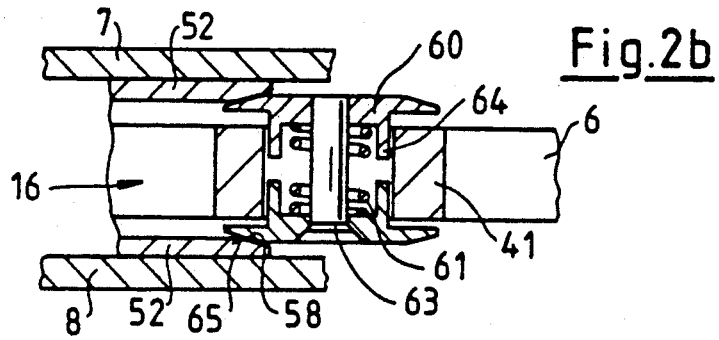

FIG. 2b shows the rotated condition of the center disk 6 where the friction elements 60 just bear on the sidewalls 52 of the capsule 50. In this rotated condition, which corresponds to a torque that approaches the full load of the engine, the only slightly dampened free movability of the center disk 6 is interrupted between the side disks 7, 8. Both the friction elements 60 and the sidewalls 52 are provided with bevels 65 respectively 58 by way of which the friction elements 60 can easily enter between the sidewalls 52.

Figure 2C:
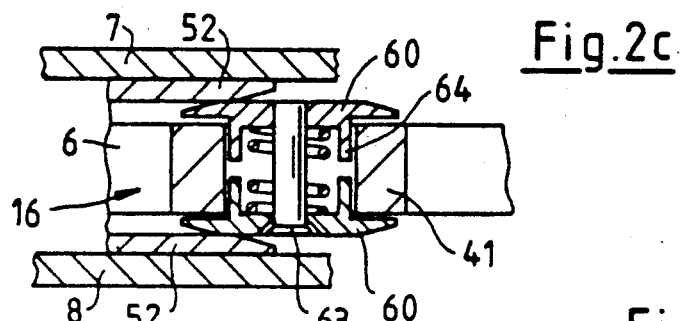

FIG. 2c shows the rotary condition of the center disk 6 in which the friction element 60 already has slightly plunged between the sidewalls 52 of the capsule. The friction elements 60 are compressed to the dimension b and, under the effect of the expansion spring 61, forced against the sidewalls 52 causing an intensive frictional contact. At the same time, the displacement chamber formed by the sidewalls 52 and cams 41 and 51 is effectively sealed so that, beginning with this angle of rotation, the enclosed damping medium can escape only through the radial gaps provided for that purpose. Therefore, at this torque corresponding to a high relative rotation of the two clutch halves, the hydraulic damping is greatly increased and supported by a simultaneous frictional damping at the contact points between the friction elements 60 and the sidewalls 52. Consequently, the advantage of this arrangement is constituted not only by the fact that an especially intensive damping is brought about at large angles of rotation that correspond to high torques and therefor torsional vibrations with high amplitudes, but also by the fact that the center disk 6 can at small angles of rotation move relatively freely between the side disks 7, 8 and axially adjust itself. The manufacturing expense for the precise installation of the center disk in the clutch can thereby be reduced.

Figure 3:
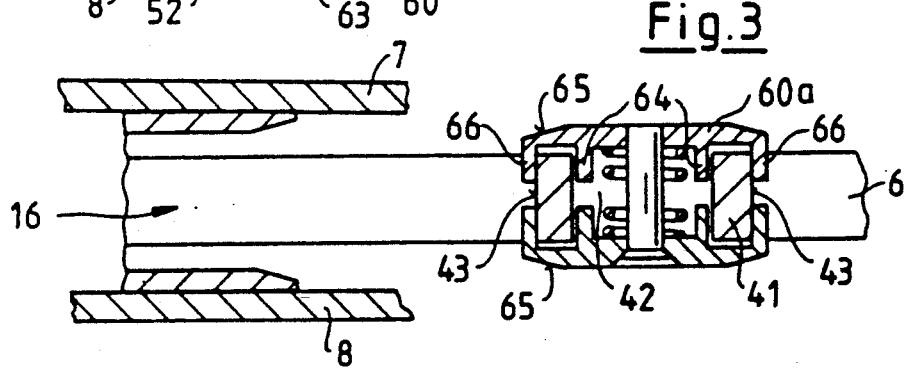

FIG. 3 shows another embodiment of the frictional element. Friction element 60a, by means of molded end walls 66, wraps around the cam 41 on its radial end faces 43. The gap acting in the peripheral direction corresponding to the design according to FIG. 2 is thereby closed. The frictional elements 60a on both sides of the cam 41 surround the cam more completely and form with the projections 64 maze seals on the openings 42. The displacement chamber 16 is sealed even better and more effectively as the cam 41 with the friction elements 60a plunges in.

Figure 4:
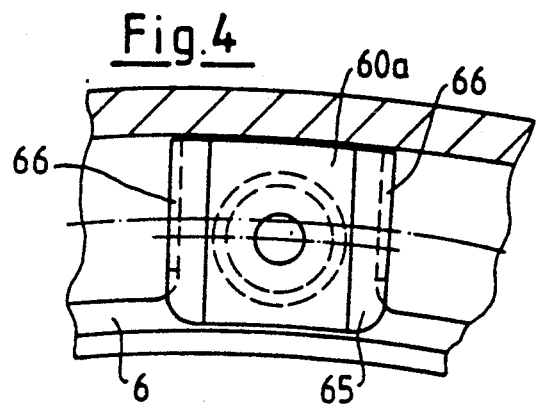
FIG. 4 is an end view of the embodiment according to FIG. 3.

FIG. 4 shows an end view of the design of the friction elements 60a according to FIG. 3. As can be seen, the friction element 60a extends radially further inward than the circular contour of the center disk, which borders on the cam 41 in both peripheral directions.

Provided on both friction elements 60 and 60a and sidewalls 52 of the capsule 50 are bevels 65 respectively 58 in both peripheral directions, so that the damping effect will adjust in both peripheral directions (thrust and traction).

The capsule 50 and the friction elements 60 and 60a are contained in the part of the clutch that is filled with a viscous medium, so that at large angles of rotation no wear should occurs despite the frictional contact. Nonetheless, it is recommended to select for the capsule 50 and the friction elements 60, 60a a material pairing which achieves a constant frictional damping over the life of the clutch. To that end, the frictional share of the overall damping may be varied through the selection of different materials and through the optimization of the force of the expanding spring. Suitable materials are known plastics or sintered metals. Suitable plastics include polyamid, PEEK, thermoplastics, duroplastics, ferrous or non-ferrous materials or composites. For fine adjustment of the especially heavy damping as the cam 41 plunges into the displacement chamber 16 in the capsule 50, provisions may be made such that the individual cams 41 within the clutch will plunge into the pertaining capsules 50 successively. This measure helps to achieve a soft response of the heavy damping.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An elastic disk clutch for a dual mass flywheel for an internal combustion engine comprising:
   a first clutch half including two side disks that are rigidly connected together on their circumference,
   a second clutch half formed by a center disk connected to a hub, said clutch halves being connected together by means of elastic clutch elements and being rotatable relative to each other,
   said side disks defining a fluid-tight interior space containing a damping medium, said center disk being received within said interior space,
   at least one displacement chamber located in the radially outer area of the interior space and contained between said side disks, said displacement chamber containing the damping medium and being variable in volume as said clutch halves rotate relative to each other, a capsule connected to said first clutch half and including defining walls and a first cam that is oriented radially inward and protrudes into said displacement chamber thereby subdividing said displacement chamber into two partial chambers, a second cam means on said second clutch half that is oriented radially inward and plunges into said capsule in the area of the defining walls and at a large angle of relative rotation between said clutch halves, said second cam means including at least one friction element which is in elastic and sealing contact with said defining walls when said second cam means plunges into said capsule.

2. The clutch of claim 1 wherein said friction element is of two-part design with one part thereof disposed on one side of said second cam means and a second part thereof disposed on the other side of said second cam means.

3. The clutch of claim 2 including an axially effective expansion spring disposed between said first and second friction element parts.

4. The clutch of claim 1 wherein each said second cam means includes two said friction elements.

5. The clutch of claim 4 wherein said second cam means includes an axially effective expansion spring disposed between said friction elements.

6. The clutch of claim 5 wherein said capsule defining walls are axially spaced and said second cam means includes bolt and stop means for adjusting said friction elements to a distance that is greater than the axial spacing between said capsule defining walls.

7. The clutch of claim 4 wherein said capsule defining walls are axially spaced and said second cam means includes bolt and stop means for adjusting said friction elements to a distance that is greater than the axial spacing between said capsule defining walls.

8. The clutch of claim 1 wherein said friction element includes an end base having a bevel adjacent said capsule to facilitate entry into said capsule.

9. The clutch of claim 1 wherein said capsule defining walls include end faces facing toward said second cam means and including a bevel for facilitating entry of said second friction element into said capsule.

10. The clutch of claim 1 wherein said friction element includes a projection means for moving into and sealing a bore of said first cam.

11. The clutch of claim 1 wherein said friction element extends from the periphery of an outer wall of said capsule to said center disk.

12. The clutch of claim 1 wherein said friction element is rectangular.

13. The clutch of claim 1 wherein said friction element wraps around end faces of said cam by means of a wall that is oriented in a circumferential direction.

14. The clutch of claim 4 wherein said friction elements including end faces having bevels adjacent said capsule to facilitate entry into said capsule.

15. The clutch of claim 14 wherein said capsule defining walls include end faces facing toward said second cam means and include bevels for facilitating entry of said friction elements into said capsule.

16. The clutch of claim 4 wherein said capsule defining walls include end faces facing toward said second cam means and include bevels for facilitating entry of said friction elements into said capsule.

* * * * *